(12) United States Patent
Simon (10) Patent No.: US 6,498,920 B1
(45) Date of Patent: Dec. 24, 2002

(54) CUSTOMIZABLE WEB-BASED TRAINING SYSTEM

(75) Inventor: David Simon, Mamaroneck, NY (US)

(73) Assignee: We-Comply, Inc., Mamaroneck, NY (US)

( * ) Notice: Subject to any disclaimer, the term of this patent is extended or adjusted under 35 U.S.C. 154(b) by 0 days.

(21) Appl. No.: 09/551,652

(22) Filed: Apr. 18, 2000

(51) Int. Cl.⁷ .................................................. G09B 3/00
(52) U.S. Cl. ........................ 434/350; 434/322; 434/323; 434/118
(58) Field of Search ................................ 434/350, 322, 434/323, 118

(56) References Cited

U.S. PATENT DOCUMENTS

| | | | | |
|---|---|---|---|---|
| 5,601,436 A | * | 2/1997 | Sudman et al. | 434/307 R |
| 5,727,950 A | * | 3/1998 | Cook et al. | 434/350 |
| 5,813,863 A | * | 9/1998 | Sloane et al. | 434/236 X |
| 5,820,386 A | * | 10/1998 | Sheppard, II | 434/322 X |
| 5,855,483 A | * | 1/1999 | Collins et al. | 434/322 X |
| 5,879,163 A | * | 3/1999 | Brown et al. | 434/236 X |
| 5,907,831 A | * | 5/1999 | Lotvin et al. | 705/14 X |
| 5,957,699 A | * | 9/1999 | Peterson et al. | 434/350 X |
| 5,974,446 A | * | 10/1999 | Sonnenreich et al. | 709/204 X |
| 5,978,648 A | * | 11/1999 | George et al. | 434/362 X |
| 6,024,572 A | * | 1/2000 | Weyer | 434/169 |
| 6,052,512 A | * | 4/2000 | Peterson et al. | 709/220 X |
| 6,086,381 A | * | 7/2000 | Downs et al. | 434/322 X |
| 6,102,406 A | * | 8/2000 | Miles et al. | 273/430 X |
| 6,106,297 A | * | 8/2000 | Pollak et al. | 434/16 X |
| 6,112,049 A | * | 8/2000 | Sonnenfeld | 434/350 X |
| 6,149,441 A | * | 11/2000 | Pellegrino et al. | 434/350 |
| 6,164,974 A | * | 12/2000 | Carlile et al. | 434/322 X |
| 6,164,975 A | * | 12/2000 | Weingraden et al. | 434/322 X |
| 6,236,955 B1 | * | 5/2001 | Summers | 703/6 X |
| 6,343,319 B1 | * | 1/2002 | Abensour et al. | 709/219 X |
| 6,347,943 B1 | * | 1/2002 | Fields et al. | 434/118 X |
| 6,386,883 B2 | * | 5/2002 | Siefert | 434/322 X |

* cited by examiner

Primary Examiner—Joe H. Cheng
Assistant Examiner—Chanda Harris
(74) Attorney, Agent, or Firm—Liniak, Berenato & White (57) ABSTRACT

A computer-based fully customizable training system for companies and organizations that includes personalized training modules incorporating employee information within the training module. The system provides authorized company representatives the ability to edit and/or augment the training content from a web browser according to the company's specific needs. Online, user-friendly training is provided in an educational and enjoyable format. With this system, an organization's representative(s) may create versions of the training modules specifically for employees of that organization. A further advantage is a cost-effective training program that is significantly less expensive than printed manuals, videos, CD-ROMs, etc.

7 Claims, 13 Drawing Sheets

Fig. 1

Welcome to the program. Please fill out and submit the following form to begin:

Your Name: ⬚ —12

*E-Mail: ⬚

Company Name: ⬚ —14

Your Title: ⬚ —16

Job Type: ⦿ HR Staff
⦿ Compliance Officer
⦿ Attorney
⦿ Other ⬚

User Name: ⬚ —18

Password: ⬚ —20

Company ID: ⬚ —22

[ Register ]

One morning Chez-Cheez President Anita Chito overheard two members of her support staff discussing "getting rich quick" by buying stock right before the company announced its record-breaking profits for the year. (EDIT CONTENT). Who could potentially face liability for violating insider-trading laws? — 98

— 94

◎ The two staff members who traded but not Anita because she didn't trade.

◎ Only Anita because she is responsible for preventing her staff members from engaging in insider trading.

◎ The two staff members who bought stock, as well as Anita as a controllng person who failed to taek any action to prevent the insider

CUSTOMIZABLE WEB-BASED TRAINING SYSTEM

BACKGROUND OF THE INVENTION

1. Field of the Invention

The invention is related to on-line Internet web-based training modules. In particular the invention offers on-line compliance training for companies with compliance training needs. The invention provides online training modules via a web-site to provide a convenient, customizable and cost-effective solution to a company's compliance-training needs.

2. Description of Related Art

Training is an integral part of an effective compliance program. Most companies that have done compliance training to date have used print-based workbooks, live or videotaped presentations by outside consultants, or computer-based training on CD-ROM. Each of these methods poses logistical problems of distribution and monitoring, especially taking into consideration corporate mergers and acquisitions that may result in very large enterprises and an increasingly mobile workforce.

Most experts agree that live, small-group training by skilled instructors is the most effective approach, but this is often impractical, especially in large companies with offices all over the country or the world. Currently distribution of training materials within companies of all sizes and locales can be expensive and difficult and inconsistent. One-size-fits-all training programs can deliver confusing messages and information to employees in varying fields and positions within a company and/or may not be relevant to a person's position in the company and to the company's business. Legal or regulatory changes may cause the need to distribute new workbooks or videotapes throughout the enterprise, incurring more cost or outdating previously distributed distributed materials. Furthermore, with these current training methods, use and comprehension of the training content is difficult to monitor and report as needed.

Providing compliance training online makes sense for many reasons. The Internet allows for immediate, inexpensive distribution of training materials within companies of all sizes and locales. Web-based training content delivers a consistent message to all employees and can be customized according to the invention to offer each employee examples and quiz questions that are relevant to that person's position in the company and to the company's business. Training materials can be updated to reflect legal or regulatory changes almost instantaneously and without the need to distribute new workbooks or videotapes throughout the enterprise. Use and comprehension of the training content can be centrally monitored in real time and charted or reported as needed.

The training modules according to the invention are readily distinguishable from the generic, one-size-fits-all programs offered by others. The invention has an ability to deliver a consistent message to all employees. Furthermore, employees have the convenience to "attend" whenever their schedules permit. A means of updating training content is available to account for legal or regulatory changes. The invention has centralized administration and monitoring of employee participation and comprehension. A capacity for customization and personalization makes the content more relevant to each employee's day-to-day responsibilities, and thus a more engaging and effective educational experience.

SUMMARY OF THE INVENTION

Accordingly, it is an object of the invention to provide a means for dynamically generated training content to give each user an employee-specific, company-specific and industry-specific educational experience.

It is a further object of the invention to personalize training modules by incorporating employee information within the training module.

It is another object of the invention to provide a company representative the ability from any web browser to customize a training module by editing and/or augmenting the content according to the company's specific needs.

It is a further object of the invention to offer user-friendly training online that is educational and enjoyable.

Another object of the invention is to enable a company representative to create versions of the training modules specifically for employees of the company.

A further advantage provided by the invention is a cost-effective training program that is significantly less expensive than printed manuals, videos, CD-ROMs, etc.

BRIEF DESCRIPTION OF THE DRAWINGS

The above-mentioned advantages and objects of the present invention will further become apparent when taken with the detailed description of the invention and with the drawings in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments and examples, it will be understood that they are not intended to limit the invention to these embodiments and examples. On the contrary, the invention is intended to cover alternatives, modifications and equivalents, which may be included within the spirit and scope of the invention as defined by the appended claims.

The present invention is part of an Internet- or intranet-based site that provides training content for users; the training content resides in a database and is dynamically generated to make each user's educational experience as employee- and company-specific as possible. The system operates with a computer using a Windows, DOS, Macintosh, UNIX or other operating system equipped with a standard web-browser application and capable of connecting to the Internet and/or a corporate Intranet. It should be noted that the term "Internet" is intended to encompass similar systems and nomenclature (i.e., World Wide Web or "www") comprising the capability to communicate and access information through a network, telephone connections, ISDN connections, DSL connections, cable modem, fiber optic network, etc. The present invention should not be limited in its communication nomenclature; the present invention is applicable to any system that is accessible by means of a web browser.

In its preferred embodiment, the system is presented on a web site, and the web site provided by the invention is designed to present textual content in preformatted "training modules" to be used by companies that need to train their employees. The web site allows a registered user to select a training topic. The training modules include a registration and log-in screen 10, such as displayed in FIG. 1. The log-in screen 10 collects user information such as the employee name 12, the company name 14, the employee's job 16, a user name 18 and password 20, and a company ID 22. The web site then generates training content that is tailored to the user's job function. Topics are usually pre-selected by company representative in order to automatically route a user to the training module(s) suited to the user's job responsibilities. This automatic routing of the training modules is facilitated by the web site program, which uses the information from the log-in screen to match a user to the appropriate training module.

At the outset, it is noted that the invention set forth herein is described with respect to a "company" having "employees" and "representatives." However, these terms are not intended to limit the, scope and application of the systems set forth by this invention. The invention is equally applicable to any organization and/or group having a common purpose, regardless of whether that organization or group includes traditional employees, contractors or other individuals that are working offsite or telecommuting part time or full time.

A template is used according to the invention for each topic to present the training content in a user-friendly, entertaining and clear manner. Training content on the web site is presented in a clear and concise manner. Each module is intended to cover a selected subject area in 30 to 45 minutes of an employee's time, including a self-assessment quiz/game. The template directs the user through a series of screens that present the training content in lesson form. After the user has completed the lesson, a game engine according to the invention presents the user with the self-assessment quiz/game related to the lesson topic. The quiz takes the form of an engaging and colorful game having a board game interface (hereinafter referred to as a board game) and requires no special plug-ins or other equipment on the user's computer. The content template and game engine are designed to consume as little bandwidth as possible to enable the programs to be used overseas and in other areas with limited connectivity.

Figure 1:
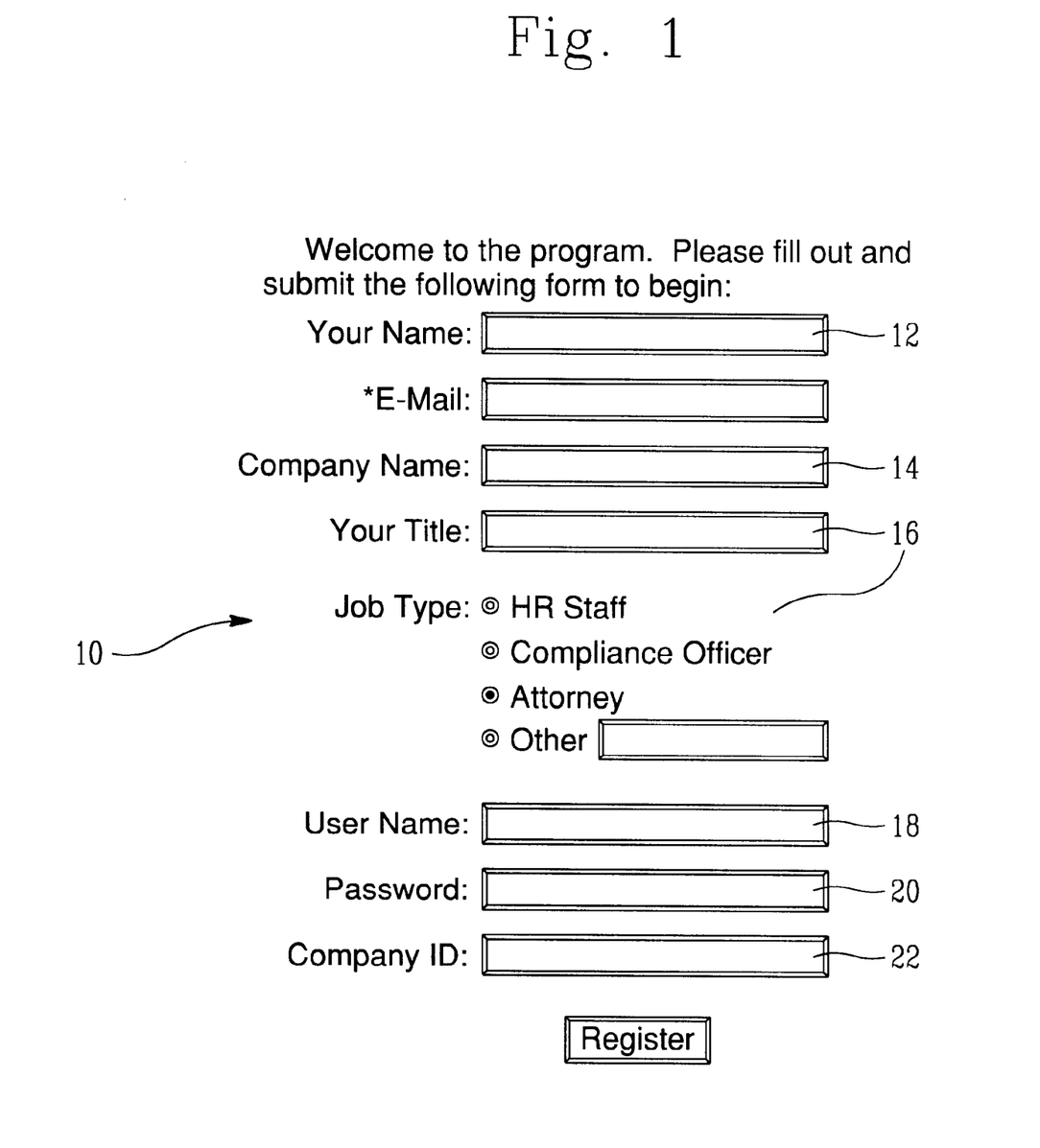
FIG. 1 depicts a registration and log-in screen according to the present invention.

The invention enables each module to incorporate information from the log-in screens 10 to make the content directly relevant to a company and each employee's job function. Thus, for example, an employee who indicates that his or her position is in "sales" will see quiz questions relating to sales, rather than distribution or manufacturing. The more relevant the content, the more effectively the needed information will be conveyed and understood.

For a company desiring even greater customization, a company representative with an appropriate authorization may access via the training content from a web browser in order to edit or augment the content in whatever way the company deems important. Thus, a company may choose different phrasing of certain elements of the lesson portion of a module and/or put greater emphasis on one or more subtopics to tailor the content to the company's particular needs and experience. Additionally, quiz questions and answers may be edited or substituted with material directly related to the company's products or customers, etc. Employees are automatically routed to the version of the module that was customized by their company's representative upon logging in.

The following modules are examples of available training programs:

Antitrust Basics;

Avoiding Workplace Discrimination;

The Foreign Corrupt Practices Act;

Preventing Insider Trading; and

Protecting Your Company's Intellectual Property.

If a company has a need for other, specific programs, new materials may be written or existing content may be re-shaped to fit the template and game engine according to the invention. Private, intra-company use is also an alternative.

An example of the customizable, personalized and interactive approach to compliance training according to the invention is described hereinafter with reference to the Figures. The training module example provides a sample "lesson" with a clear and concise explanation of exemplary pertinent legal principles. The lesson is followed by "Ethical Pursuit," an interactive board game that quizzes a user on the lesson material and allows the user to apply what was learned in the lesson. The board game presents hypothetical situations for the user to analyze. When the user responds correctly, he or she moves around the board and earns a Certificate of Completion when the game is finished. Each of the training modules follows this basic lesson and game template and has the customizable features to be described herein.

Figure 2:
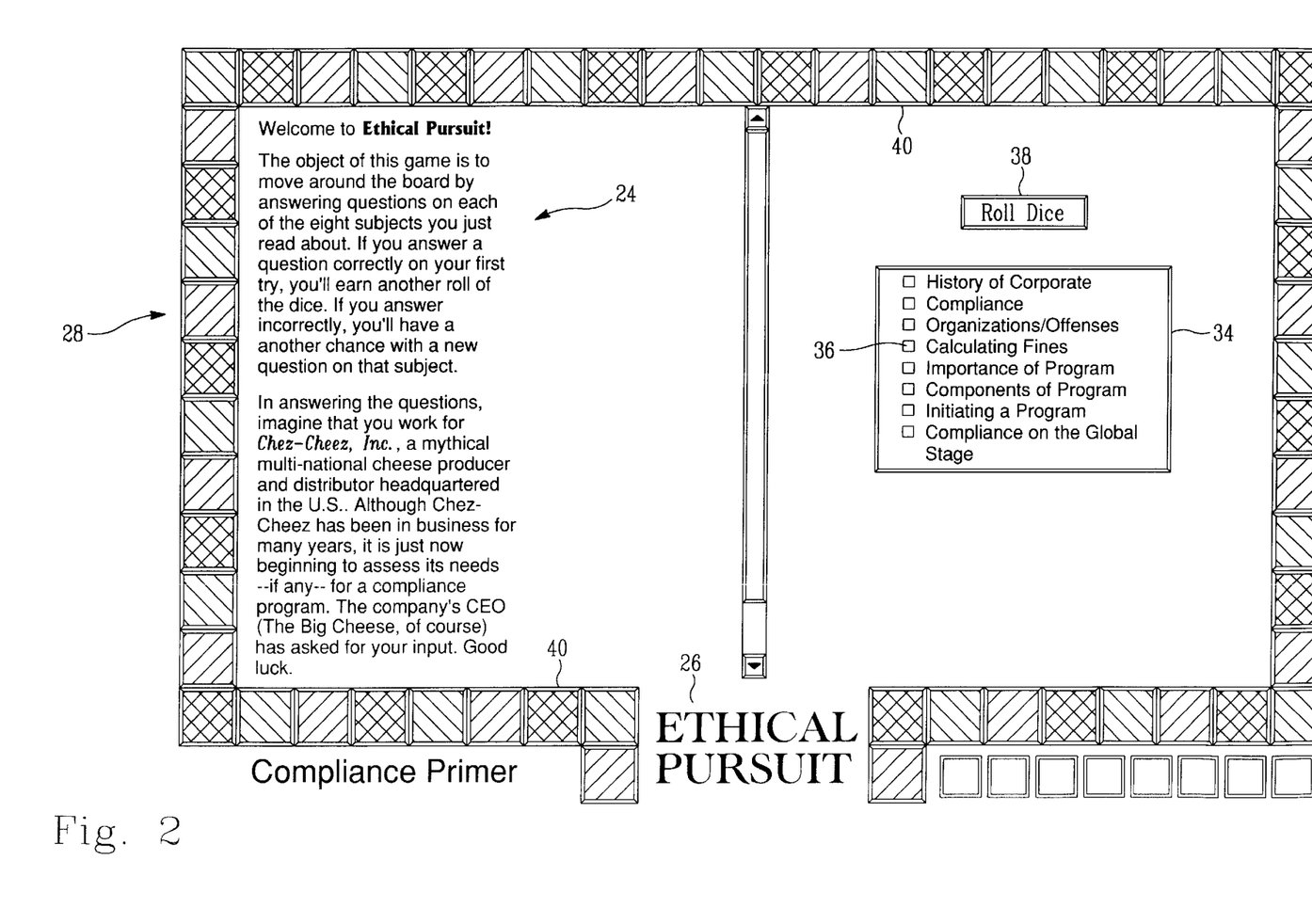
FIG. 2 shows a screen from the web site according to the invention of an introduction to the board game "Ethical Pursuit"
Figure 3:
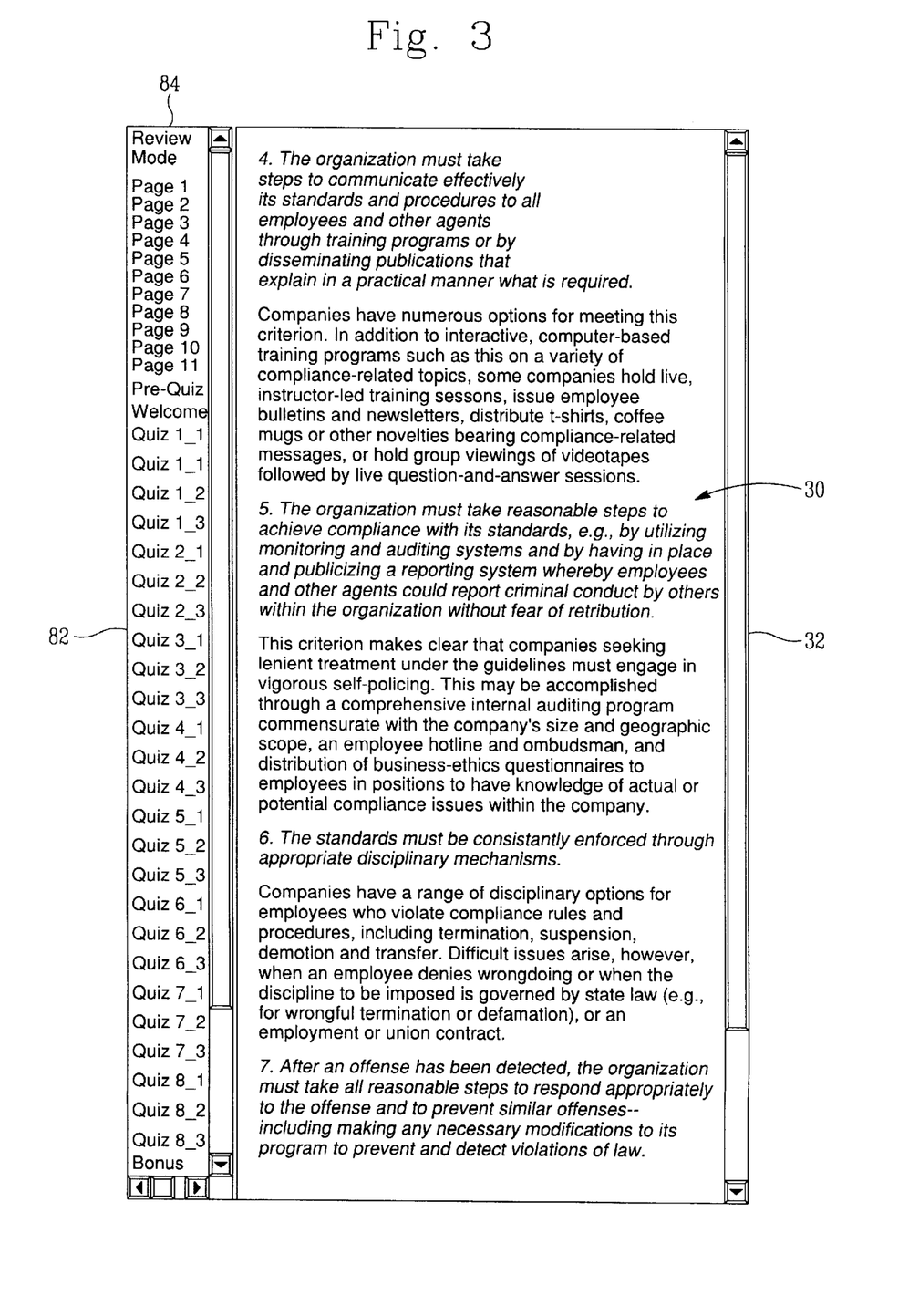
FIG. 3 shows an excerpt from a sample lesson according to the invention.

FIG. 2 displays a screen from the web site according to the invention. The screen shows an introduction 24 to the board game "Ethical Pursuit" 26. The object of this game 26 is to move around the board 28 by answering questions on each of a number subjects presented in the lesson. An excerpt from a sample lesson 30 is shown within a window 32 in FIG. 3. The lesson 30 is presented to the user prior to the game in a series of screens on-line. The user can peruse and click through the lesson screens and topics at the user's own pace. The screen in FIG. 2 shows the board game 28, a legend 34 to identify. the subject according to a symbol or color 36, basic game instructions 24, and a "Roll Dice" button 38 to initiate the. start of the game. The game board 28 has landings 40, each of which has a symbol or color 36 corresponding to one of the subjects designated in the legend 34.

In the example of FIGS. 2–10, the user, while answering quiz questions, imagines that he or she works for "Chez-Cheez, Inc.," a mythical multi-national cheese producer and distributor headquartered in the U.S. Although Chez-Cheez has been in business for many years, it is just now beginning to assess its needs, if any, for a compliance program. The company's CEO (The Big Cheese, of course) has asked for the user's input. This game scenario is meant as an example of an entertaining and interesting way to engage the user in the lesson subjects and enhance the training effectiveness.

Figure 4:
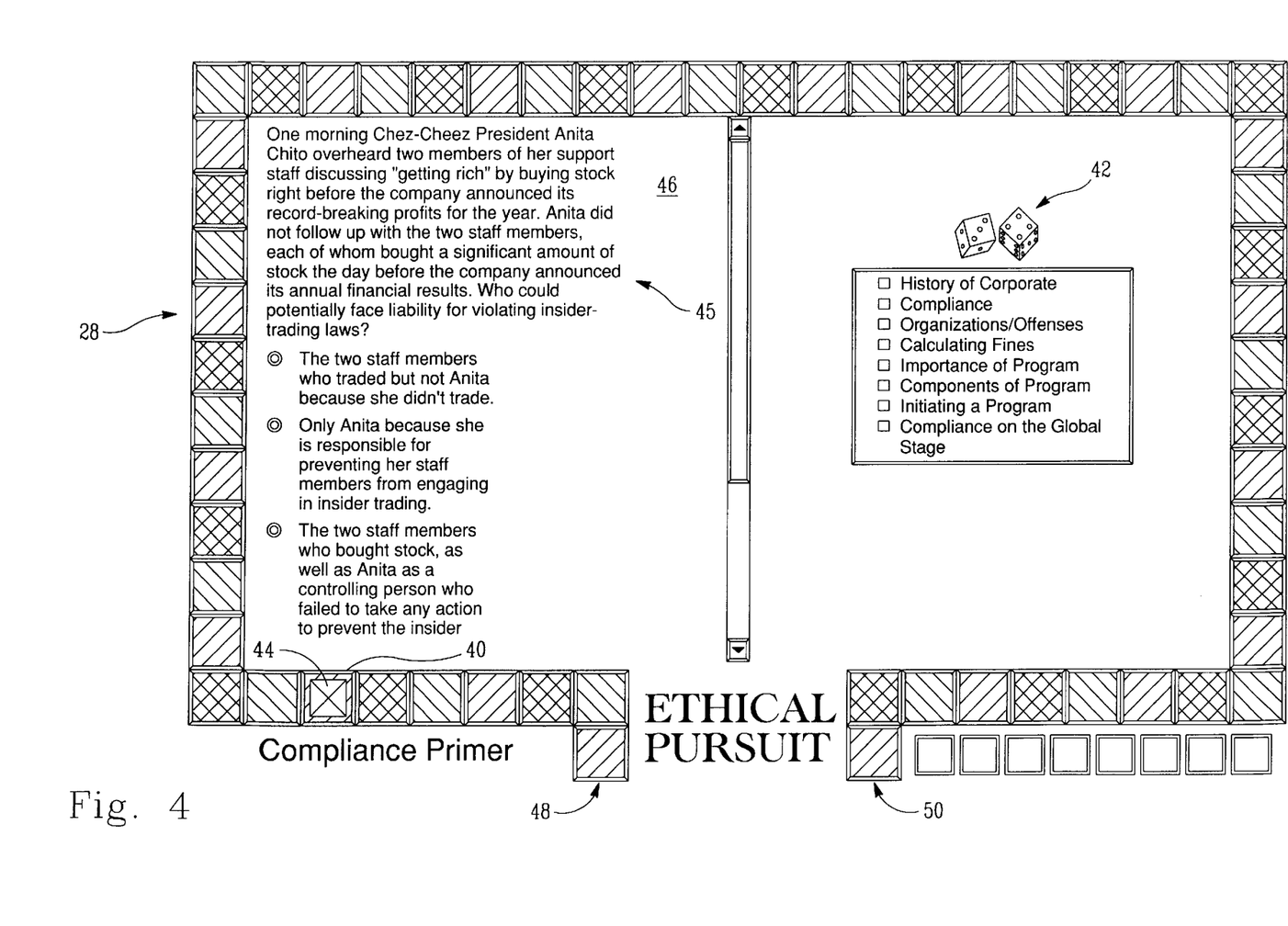
FIG. 4 shows a screen that follows the screen presented in FIG. 2, showing a dice roll of "7" and the game token moved the seven spaces according to the dice roll.

In FIG. 2, the user initiates the game 26 by clicking on the "Roll Dice" button 38. FIG. 4 displays the next screen showing a dice roll 42 of "7" and the game token 44 moved the seven spaces according to the dice roll 42 to a landing 40. A question 45 and three possible answers are presented in the window 46 relating to the subject designated by the landing's 40 symbol or color 36. If the question 45 is answered correctly on the user's first try, the user earns another roll of the dice to move the token 44 further around the board 28. If the question 45 is answered incorrectly, the user has another chance with a new question on the same subject of the landing 40. Additional questions on the same topic are presented until the user answers one correctly on the first try. When the user moves all the way around the board 28 from the start 48 to the finish 50, a final question and a chance to earn a Certificate of Completion are presented.

Figure 5:
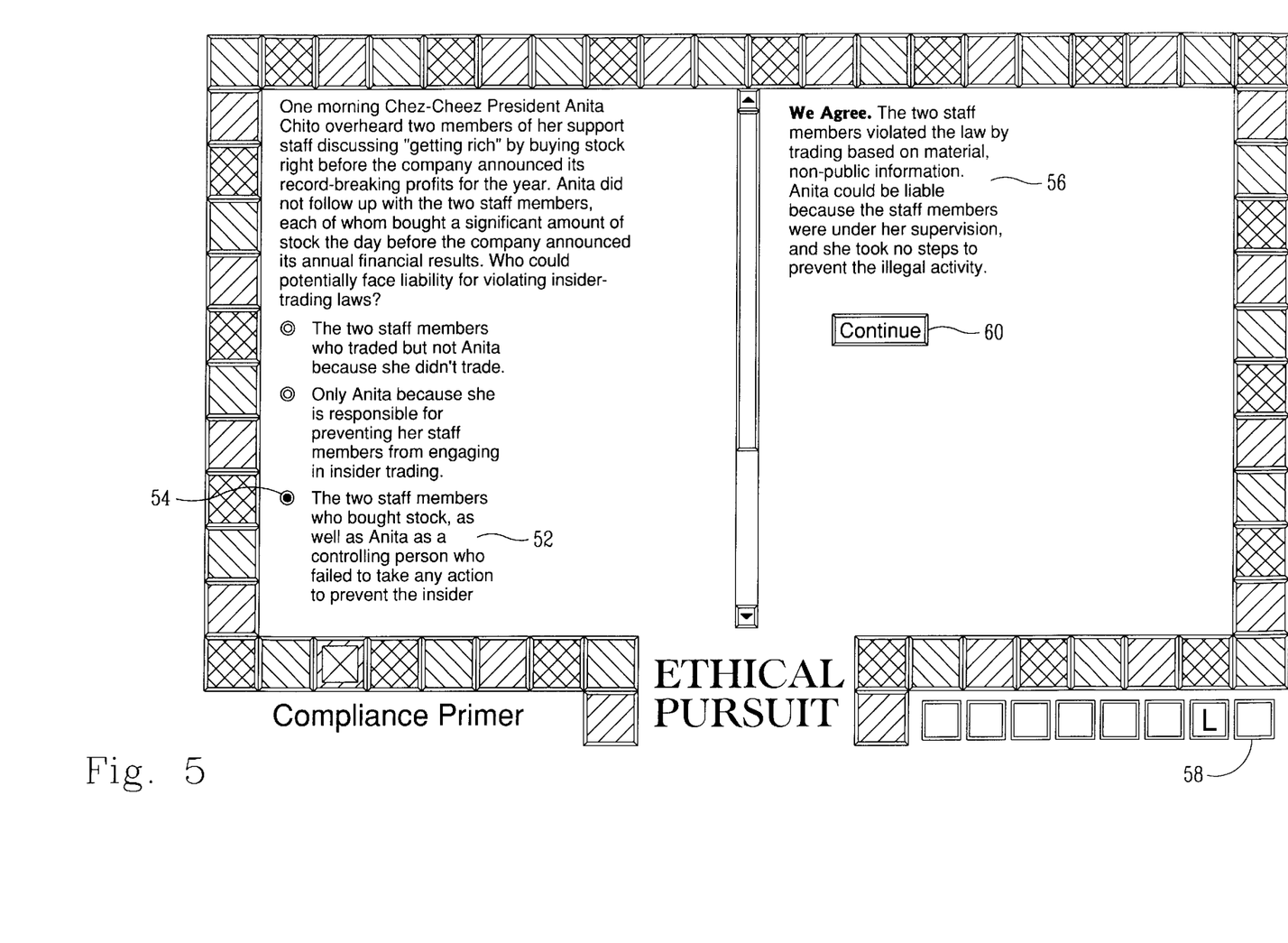
FIG. 5 displays a selection of the bottom answer as indicated by the bullet of the quiz question presented in FIG. 4.

FIG. 5 displays the user's selection of the bottom answer 52 indicated by the bullet 54, and a corresponding feedback message 56 explaining that the user's selection was correct and for what reasons. Furthermore the user is awarded a letter "L" to show the game progress in an attempt for the user to complete the game and spell out a word 58. A "Continue" button 60 is shown for the user to click since the correct answer earns another dice roll.

Figure 6:
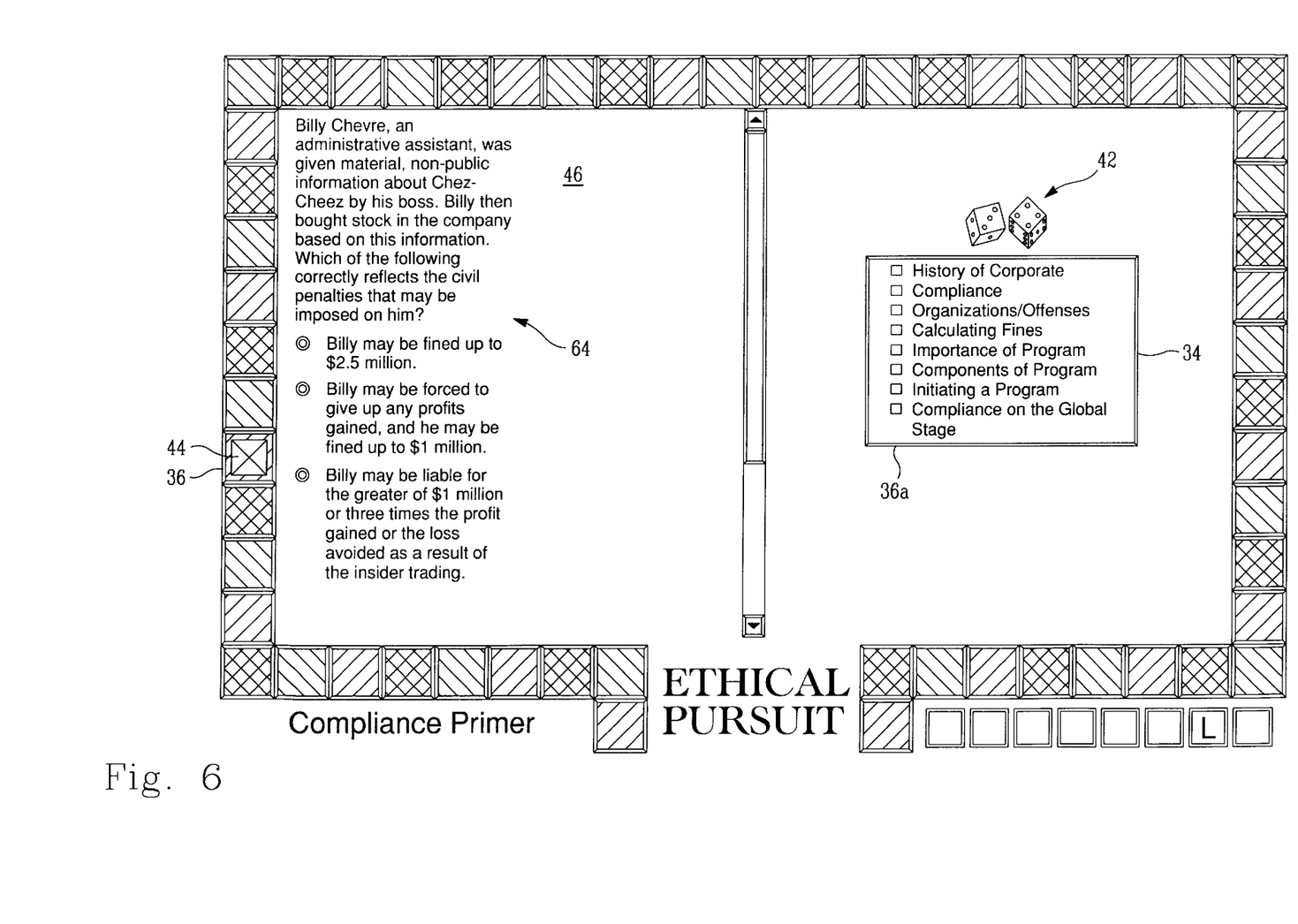
FIG. 6 shows a screen following a click of the "Continue" button viewed in FIG. 5 and showing a dice roll of "6"
Figure 7:
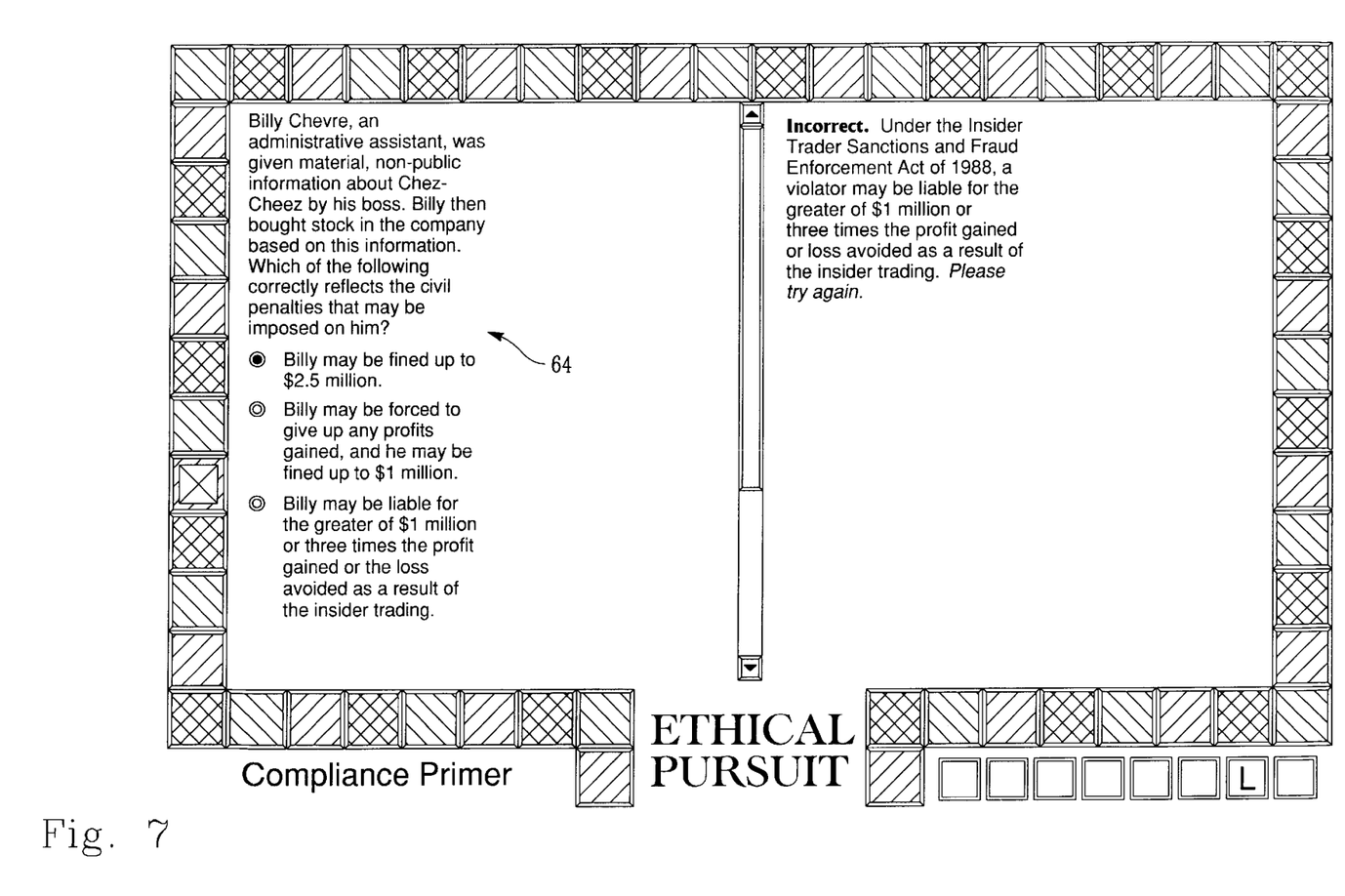
FIG. 7 displays a selection of an incorrect answer from the question presented in FIG. 6 and appropriate feedback explaining why the answer is incorrect.
Figure 8:
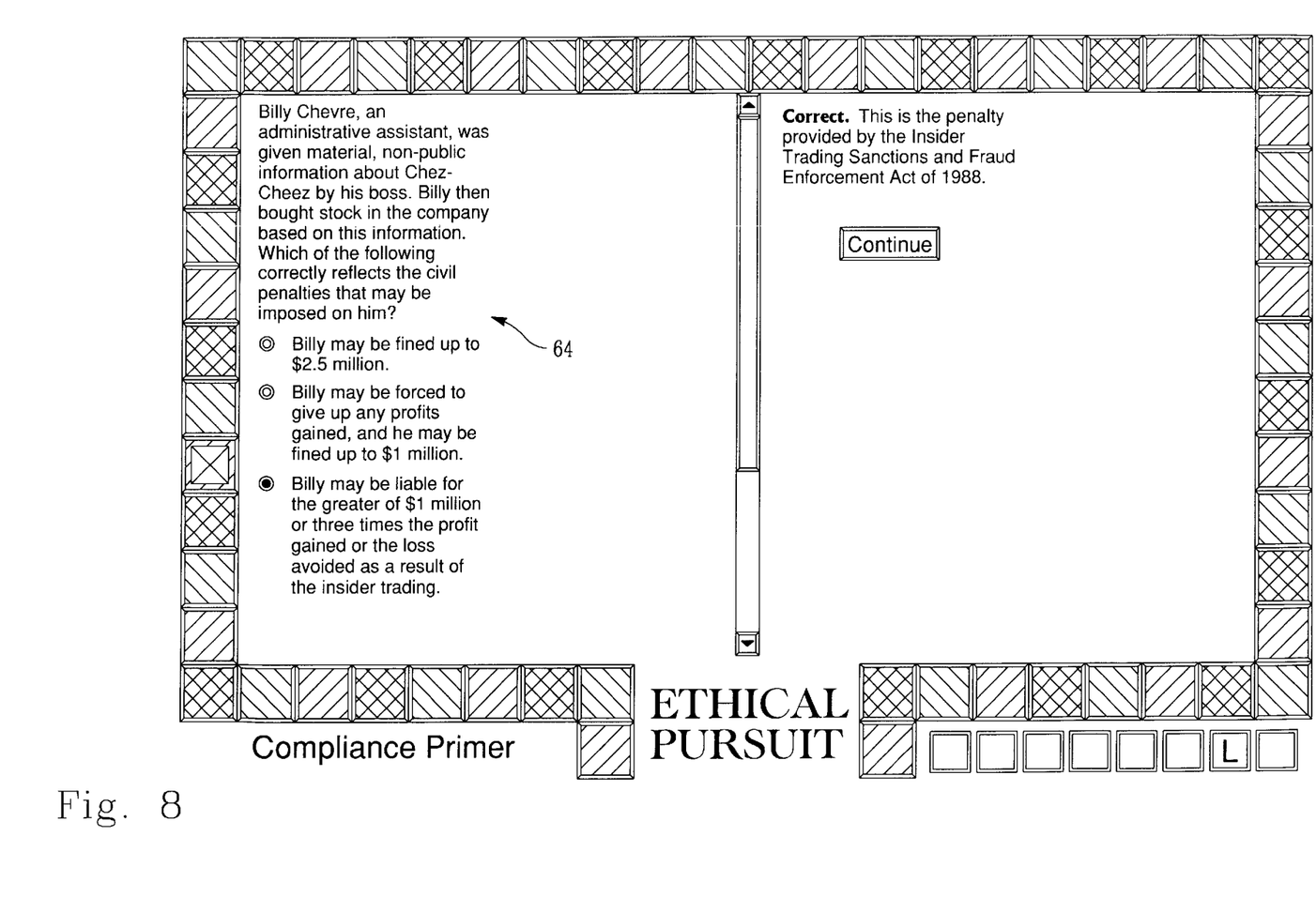
FIG. 8 displays a later screen in which the same question has been answered correctly following the incorrect answer for that question shown in FIG. 7.

FIG. 6 displays the next screen following a click of the "Continue" button 60, showing a dice roll 42 of "6" and the game token 44 moved six spaces to a new landing 40. Another question 64 is presented in the window 46 relating to the subject designated by the new landing's symbol or color 36 according to the legend 34 listing a series (column) of symbols or colors 36a. FIG. 7 displays the user's selection of an incorrect answer and the appropriate feedback explaining why the answer is incorrect. FIG. 8 displays a later screen, in which the user has correctly answered the same question following the incorrect answer for that question, which was shown in FIG. 7.

Positive feedback is shown explaining that the selected answer is correct. The "Continue" button can then be clicked on to continue the game.

Figure 9:
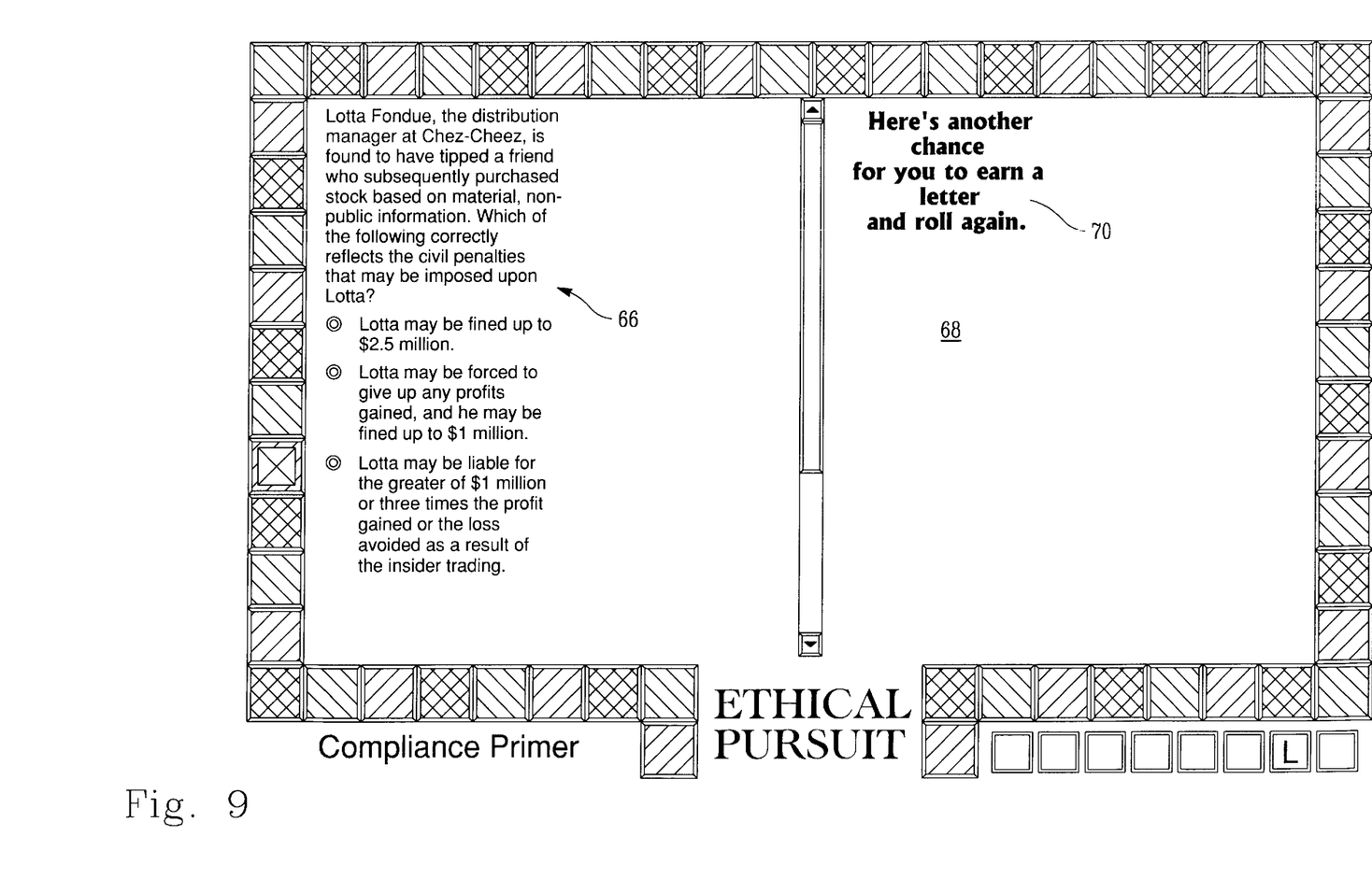
FIG. 9 shows the screen following FIG. 8 and presenting a second question on the same topic as in the prior question.
Figure 10:
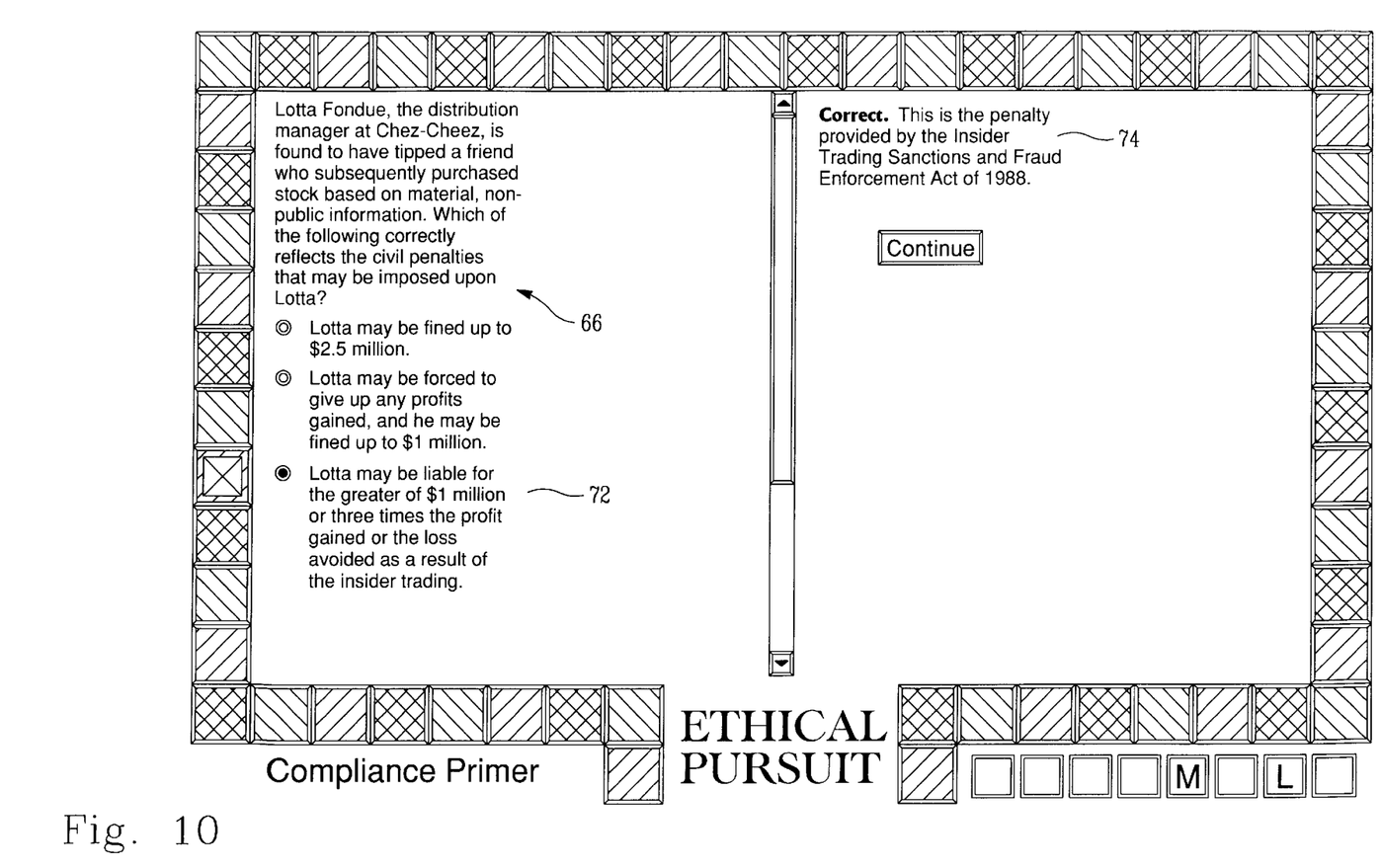
FIG. 10 displays the next screen following FIG. 9, showing the user's correct answer, positive feedback and a letter "M" awarded to the user.

FIG. 9 presents the following screen, which presents a second question 66 on the same topic as in the prior question 64, since the user has not earned a dice roll yet and the token is on the same landing. The feedback window 68 has an encouraging message 70 to prompt the user to continue successfully. FIG. 10 displays the next screen showing the user's correct answer 72, positive feedback 74, and a letter "M" in the word 58 rewarded to the user. It will be understood by this sample the procession of the game to completion, and further exemplary dice rolls, questions and answers would be redundant.

The game continues while the user answers questions correctly and is encouraged by prompts such as "One more and you get a shot at the bonus question." At the end of the game the user views, "You did it! Now answer the following question correctly to earn a Certificate of Completion." When this final "bonus" question is answered correctly, the user is praised, "Congratulations! Click the button to receive a Certificate, which you may print for your records." It will be understood that such prompts are exemplary and are fully customizable along with the lesson content and quiz questions and answers, which will be described next.

Figure 11:
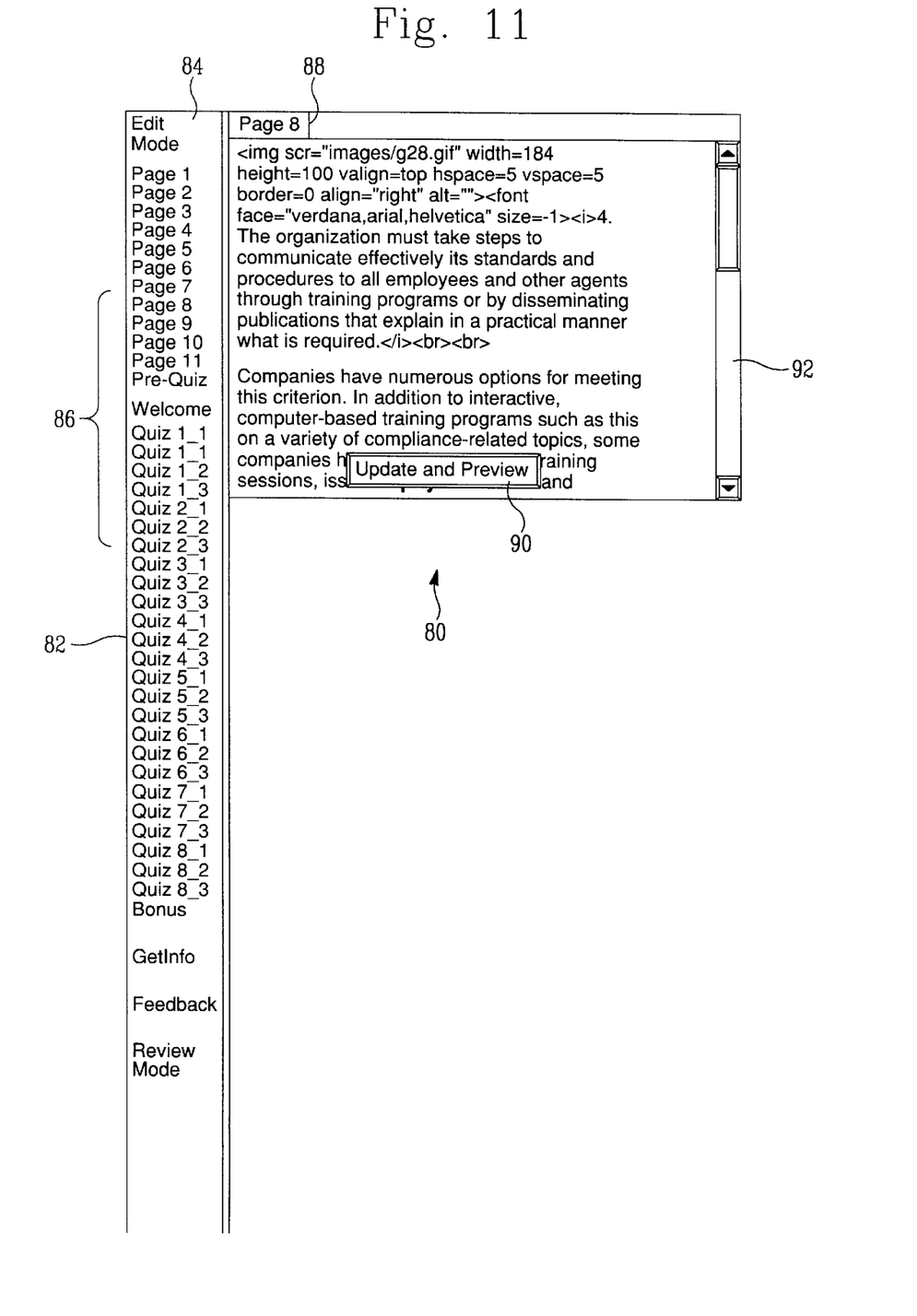
FIG. 11 displays a review-and-editing mode according to the invention.

FIG. 11 displays a review-and-editing mode 80, where an authorized company representative can customize the lesson content and quiz to suit a company's needs. An itemized menu bar 82 is shown, which indicates at the top 84 that the representative is in "Edit Mode." The representative can move through the lesson and quiz using the links 86 on the menu bar 82. The pages are listed in the order used in the program. Edit mode allows the representative to choose a lesson page (numbered 1–11 and pre-quiz) or a quiz question (numbered 1–8, and bonus) from the menu bar 82 that is to be modified, i.e. customized. In FIG. 11, "Page 8" 88 has been selected for editing and is shown in the editing window 80. A scroll bar 92 is provided so that the content in the editing window 80 can be scrolled through. An "Update and Preview" button 90 is shown on the screen so that the representative can review desired changes, which are entered directly into the text of "Page 8." When the button 90 is clicked on, the modified text of Page 8, shown in FIG. 3, puts the representative in "Review Mode" as indicated at the top 84 of the menu bar 82. Here page 8 of the lesson as it appears in the template is shown. If any changes had been made in the edit mode, they would appear here in the review mode for the representative to preview and verify that changes were made correctly.

Figure 12:
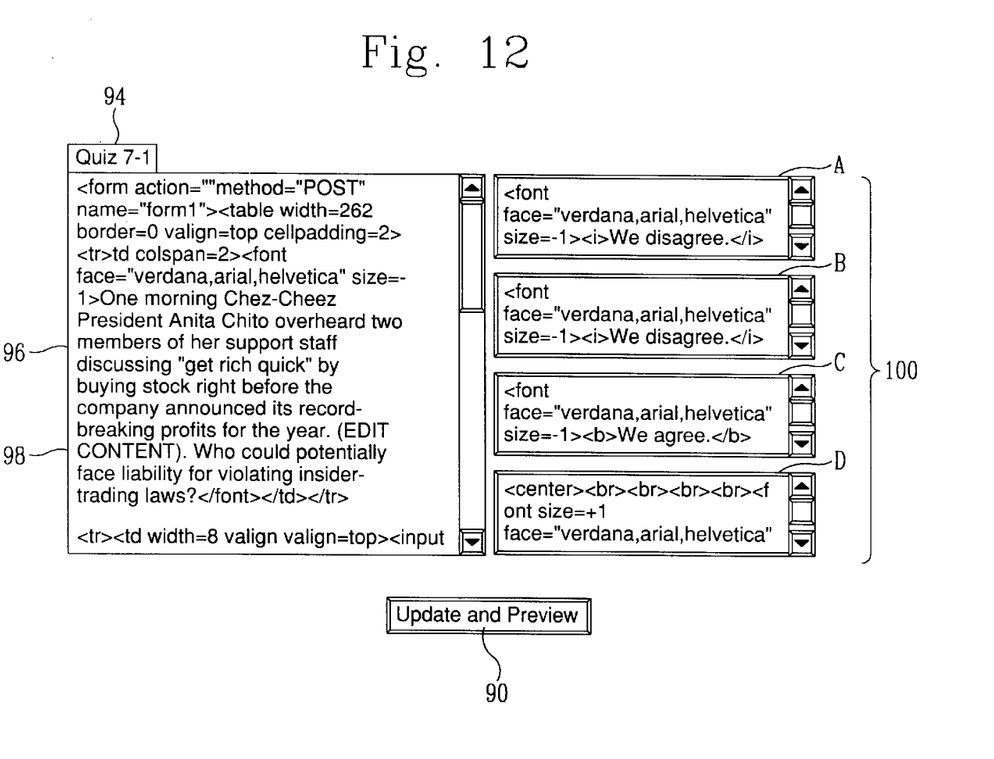
FIG. 12 shows a screen in the edit mode for editing a quiz question according to the invention.

FIG. 12 shows a screen in the edit mode for quiz question 7-1 as indicated at 94, which was shown FIGS. 4 and 5. In the left window 96 "(EDIT CONTENT)" 98 has been entered directly into the text of the window 96 to exemplify the content of the quiz question being customized. In the right four windows 100 the quiz answers A, B, and C and the feedback prompt D can be customized. Scroll bars are provided on each of these windows so the representative can scroll through the entire content of the quiz question and answers.

Figure 13:
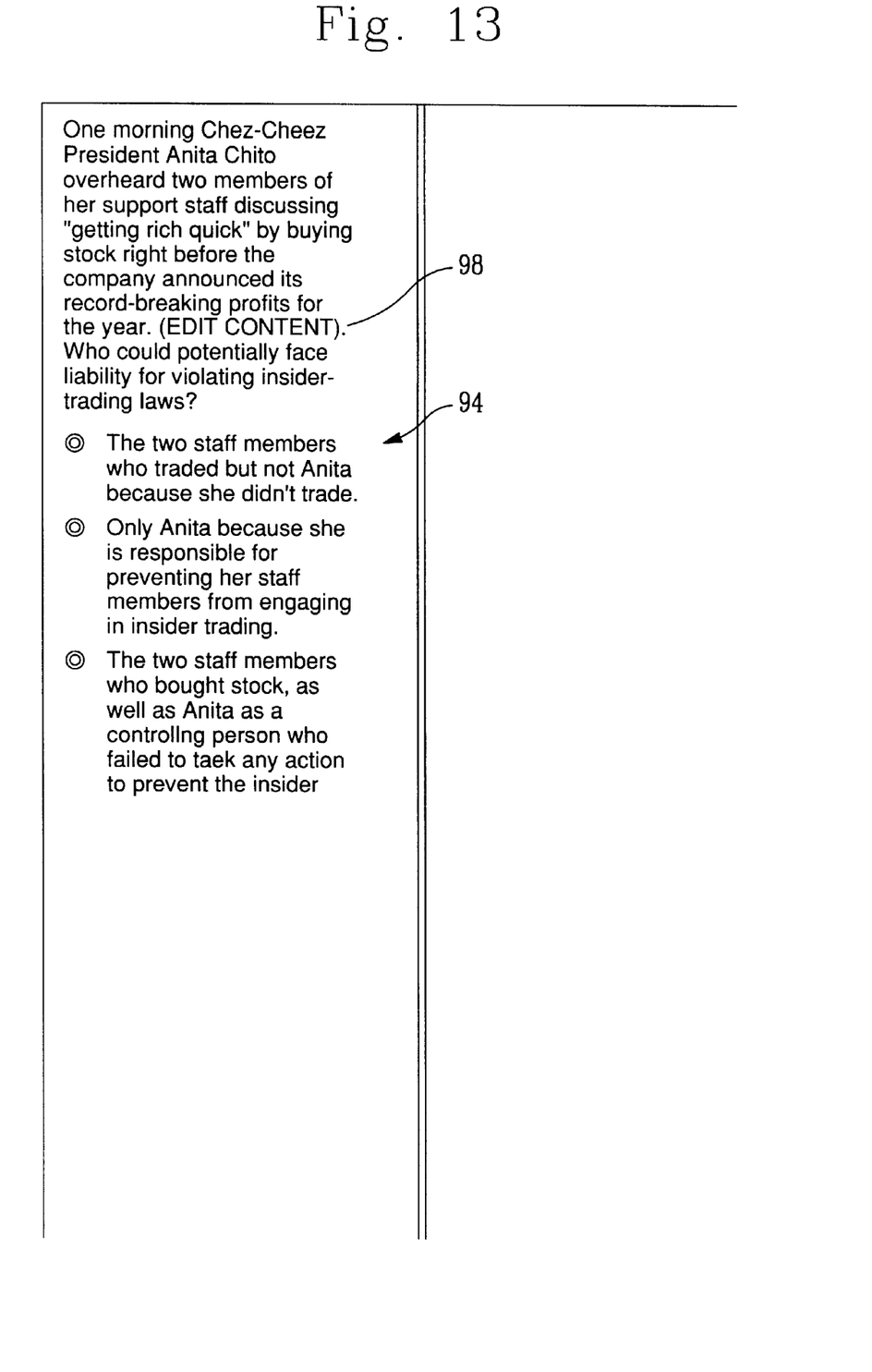
FIG. 13 shows the review-mode screen that appears after the "Update and Preview" button has been clicked following editing as depicted in FIG. 12.

FIG. 13 shows the next screen to appear after the "Update and Preview" button 90 has been clicked on. The quiz question 94 is previewed here by the representative, and it can be seen that the customized portion of the question "(EDIT CONTENT)" 98 now appears in the question.

It will be understood by this description of the template and game engine provided by the invention that the lesson and question content is fully customizable to suit the needs of a company requiring training on virtually any topic. The sample lesson and question content contained herein are exemplary in nature and are not intended to limit the scope of the invention. It will be further understood that alternative game boards may also be selected and that the game board layout described herein is intended to be exemplary.

From the foregoing description, it is understood that the present invention provides a system that includes personalize training modules by incorporating employee information within the training, module. The invention also provides a company representative the ability to customize training modules from a web browser in order to edit and augment the content according to specific needs. The invention also provides online, user-friendly training that is both educational and enjoyable. With this invention, a company representative may create versions of the training modules specifically for employees of the company. A further advantage provided by the invention is a cost-effective training program that is significantly less expensive than printed manuals, videos, Having thus described various exemplary embodiments of the invention, it will be understood by those skilled in the art that modifications or changes in details of the invention may be implemented without departing from the spirit and scope of the invention as defined in the following claims.

What is claimed is:

1. A personalized and customizable on-line training system comprising:

a web-site on the Internet which a user may connect to on-line using a personal computer and log into using identifying user information;

a system program associated with said web-site, said system program controlling and implementing functions of said on-line training system;

at least one training module provided by the system program, each said at least one training module having an associated training subject and a lesson template which presents the training subject in a series of on-line screens enabling the user to read and click through at a selected pace, wherein said lesson template is implemented by the system program, wherein said system program uses said user information to automatically personalize said at least one training module to have content relevant to said user, wherein said system program enables a specially authorized user having specific identifying user information to customize said at least one training module via an editing mode, said editing mode allowing said authorized user to access and edit content, including at least one of text and graphics, within a training module, to customize the training content in a desired manner, and further comprising a review mode which the system program presents to the authorized user, wherein said review mode allows the authorized user to review and verify changes that the authorized user made to a training module while in the editing mode, and wherein said at least one training module further comprises a game engine which the system program initiates following the user's completion of the lesson template, wherein said game engine presents the user with an interactive game having a series of questions and answers related to the training subject and automatically personalized to be relevant to said user.

2. The system according to claim 1, wherein said editing mode allows said authorized user to access and edit content, including at least one of text and graphics, within said series of on-line screens, to customize the training content presented therein in a desired manner.

3. The system according to claim 1, wherein said editing mode allows said authorized user to access and edit content, including at least one of text and graphics, within a training module, including said series of on-line screens and said series of questions and answers, to customize the training content presented therein in a desired manner.

4. A method for personalized and customizable on-line training, comprising the steps of:

accessing a web-site on the Internet via a personal computer;

logging-in to at least one training module on the web-site by inputting identifying user information to register as a user;

accessing an on-line training session from the web-site, said training session comprising a lesson template presenting a training subject in a series of customizable on-line screens; and customizing the on-line training module, wherein said step of customizing comprises the further steps of:

logging-in as a specially authorized user by inputting specific identifying user information recognized by the web-site;

entering an editing mode, said editing mode allowing said authorized user to access and edit content, including at least one of text and graphics, within a training module thereby customizing the training subject in a desired manner; and entering a review mode, said review mode allowing the authorized user to review and verify changes that the authorized user made to a training module while in the editing mode, and further comprising the steps of:

reading the series of on-line screens;

completing the lesson template;

initiating an interactive game, said game comprising a series of questions related to the training subject and a game which the user completes by correctly answering the questions; and playing the interactive game.

5. The method according to claim 4, wherein said step of accessing a training session occurs automatically based on the user information to present the user with a training session having a relevant training subject.

6. The method according to claim 4, wherein the game has a game board which has a succession of landings for the user to move a game piece through and wherein said step of playing the game comprises:

starting a game piece on a first landing;

reading a first question and several possible answers presented for the first landing;

selecting an answer from the several possible answers to the first question;

advancing to a next landing upon-selecting a correct answer; and continuing the game in the described manner until a final landing in the succession of landings is reached by the user.

7. The method according to claim 4, wherein said editing mode allows said authorized user to access and edit content within a training session, including said series of online screens and said series of questions and answers, to customize the training content presented therein in a desired manner.

\* \* \* \* \*